Oct. 20, 1959          E. G. LAUE          2,909,059
MEANS FOR DETECTING RESONANCE VIBRATION
Filed May 25, 1956
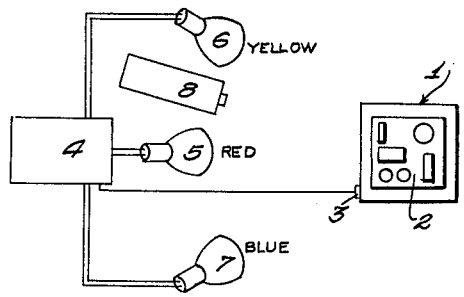
*Fig.1*
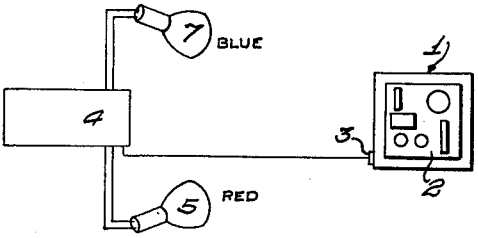
*Fig.6*
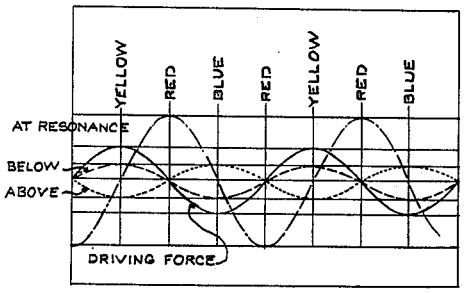
*Fig.2*
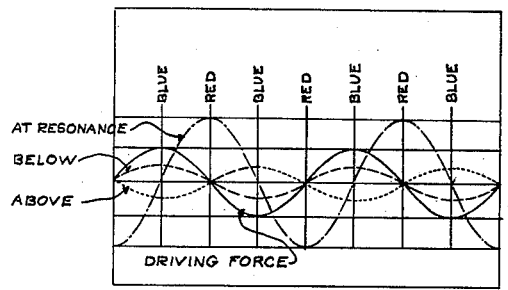
*Fig.7*
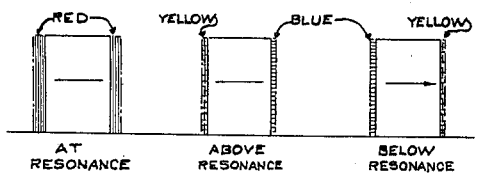
*Fig.3*    *Fig.4*    *Fig.5*
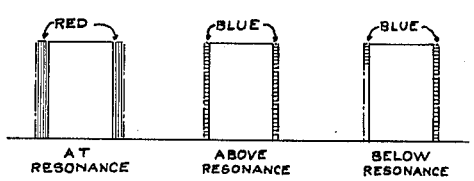
*Fig.8*    *Fig.9*    *Fig.10*
INVENTOR.
ERIC G. LAUE
BY Lyon & Lyon
ATTORNEYS United States Patent Office 2,909,059
Patented Oct. 20, 1959

2,909,059

MEANS FOR DETECTING RESONANCE VIBRATION

Eric G. Laue, San Gabriel, Calif., assignor to California Institute Research Foundation, Pasadena, Calif., a corporation of California Application May 25, 1956, Serial No. 587,348

6 Claims. (Cl. 73—71.4)

This invention relates to means for detecting resonance vibration. Many types of apparatus, devices or mechanisms must be designed to withstand vibration when in use. This is true of vehicle carried apparatus and equipment, particularly those carried by high speed aircraft. If any component of a highly complex mechanism should fail, the entire aircraft may be placed in jeopardy. While not limited to electronic equipment, it is especially true of such equipment with its large number of component parts any one of which may have a resonant frequency within the range of vibration frequency to which it is subjected.

For example, a simple half-watt resistor may be so mounted between a pair of terminals as to have a resonant frequency ranging between 200 and 1000 cycles per second. If, in a particular installation the resonant frequency coincides with the vibration frequency to which it is subjected, the resistor might fail; whereas, if it was so mounted as not to experience its resonant frequency or be properly dampened, it would give no trouble.

Now, with the large number of components in even relatively simple electronic equipment and the fact that even though such equipment is made to close tolerances, it is impossible to predict that a particular component will be so installed as to exhibit the desired frequency response.

The present invention seeks to overcome this problem, and accordingly, the objects of this invention include:

First, to provide a means for detecting resonant vibration wherein an apparatus or mechanism to be tested is subjected to non-destructive vibration of selected range of frequencies and exposed to stroboscopic light of different colors flashed at corresponding or preselected frequencies but timed to coincide with the zero and peak points of the vibration cycle, whereby those components undergoing resonant vibration exhibit a halo corresponding to the light flashing at the zero points of the vibration cycle, whereas those components having resonant frequencies above or below the frequency of the test vibration exhibit a contrasting color.

Second, to provide a means of this class wherein synchronizing signals from a complex vibrating system such as may be produced by the various types of machinery when in operation, or by motors or engines such as internal combustion engines, and turbines, may be used to control stroboscopic light sources operating in predetermined phase relationship thereby to detect components of such machinery, engines, or other equipment as may be vibrating at, above, or below the frequencies of the synchronizing signals.

Third, to provide a means of this class wherein the vibration imparted to the components undergoing test may be in the nature of "noise" or random excursions, wherein the mechanical "q" of the various components causes them to vibrate at their natural frequency, and the stroboscopic light is caused to operate at changing frequencies with the various stroboscopic light sources maintained in their respective phase relationships.

Fourth, to provide a means of this class which may be arranged to detect not only those components which are vibrating in resonance, but also to distinguish between those components having resonant frequencies above and those having resonant frequencies below the frequency of the test vibration.

Fifth, to provide a means of this class which minimizes the time required to conduct a vibration test, and does not require the application of vibrations of a destructive amplitude thereby to provide a means and method which lends itself to assembly line testing of all the units undergoing manufacture as distinguished from spot or random testing of selected units.

Sixth, to provide a means of this class wherein the apparatus or assembly undergoing test may be photographed for record purposes or to aid in later correction of the defects which were detected.

With the above and other objects in view as may appear hereinafter, reference is directed to the accompanying drawings in which:

Figure 1 is a diagrammatical view illustrating one form of the apparatus in which three light sources are employed.

Figure 2 is a graph in which is plotted the phase relationship of the driving force and displacement of typical devices or components undergoing tests.

Figures 3, 4, and 5 are diagrammatical views shaded to indicate color to illustrate the condition of components by ratings; respectively, at resonance, above resonance, and below resonance.

Figure 6 is a diagrammatical view similar to Figure 1 showing an arrangement in which two light sources are employed.

Figure 7 is a graph similar to Figure 2 showing driving force and displacement.

Figures 8, 9, and 10 are diagrammatical views shaded to indicate color to illustrate the condition of components vibrating at resonance, above resonance, and below resonance, respectively, when illuminated by the arrangement shown in Figure 6.

Reference is first directed to Figure 1. In the construction herein indicated diagrammatically a vibration test stand or table 1 is employed which is operated by suitable means not shown so as to vibrate at various selected frequencies, and at varying amplitudes so as to conduct a vibration test of a device of apparatus 2.

Connected to the vibration test stand or to the control apparatus which regulates the frequency of vibration, is a vibration sensing means 3 which is suitably connected to a stroboscopic timing apparatus 4 capable of producing pulses in synchronism with the vibration of the test stand 1.

The stroboscopic timing apparatus 4 may be conventional such as that disclosed on pages 74 and 137 and described in chapter IV of "Electronic Time Measurements," vol. 20, Radiation Lab. Series by Chance, Hulsizer, MacNichol, and Williams, a McGraw Hill publication published in 1949.

The stroboscopic timer 4 is arranged to operate stroboscopic lamps 5, 6, and 7 which are positioned to illuminate the apparatus 2 undergoing a test. The stroboscopic timer 4 is arranged so that while the three light sources, 5, 6 and 7 are in synchronism with the vibration of the table, they are caused to operate in predetermined phase relation to the driving force which vibrates the table. This is illustrated in Figure 2.

By way of example the light source 5 may be caused to flash at one or both of the node points of the driving force whereas the light source 6 may flash at the positive peak of the driving forces and the light source 7, at the negative peak of the driving force. If both node points are used, the frequency of the light flashing at these points will be twice the frequency of the light flashing at the positive or the negative peak.

It is a well established fact that if an object is in resonance with the driving force, its maximum vibration peaks will be 90° out of phase with the maximum peaks of the driving force, that is, in phase with the null points of the driving force.

Thus assuming that the apparatus undergoing a test includes a component having a natural frequency in resonance with the frequency of the driving force there will be a tendency for such component to exhibit a halo of light corresponding to light source 5. For purposes of illustration, this may be assumed to be a red light and consequently the component will exhibit a red halo as represented in Figure 3. The portions of the component between the halo extremities are at various times exposed not only to red but also to the blue and yellow lights, consequently, due to persistency of vision these intervening portions will appear as a blend of the three colors and be readily distinguished from the halo extremities or margins.

The components which are not in resonance will to a more or less degree lead or lag the movement of the table, that is, the phase angle of such components will be more or less than 90°.

Thus components which are below resonances will be in one extreme position when the light source 6, for example, a yellow light source, is flashed and in its other extreme position, when the light source 7, for example, a blue light source, is flashed. The result is such that components which have a resonance above the vibration frequency of the driving force will exhibit a yellow halo on one side and a blue halo on the opposite.

Conversely, those components which have a natural frequency below the frequency of the driving force will exhibit the blue and yellow halos in reverse, as indicated by comparison of Figures 4 and 5. Except for their marginal portions, the various components will exhibit a color which is additive of the three light sources.

The method of detecting components in resonance consists in vibrating an apparatus to be tested at a predetermined frequency while being exposed to stroboscopic light operating at various, relative phase displacements. Since all of the components are subject to the vibrations of the same driving force, they all vibrate at the same frequency as the driving force or harmonics of that frequency. The phase relationship of the vibrations of a particular component with respect to the driving force will be different depending upon whether the component is being vibrated at its resonance frequency or above or below the resonance frequency.

Thus, for example, by utilizing three lights of different color, and arranging them to operate or fire at instances which correspond respectively to the vibration peaks of: (a) those components which are in resonance with the driving force; (b) those components which are below resonance; (c) and those components which are above resonance the various components will exhibit readily distinguishable colored halos. The halo of those components which are in resonance will be of greater magnitude. The amplitude of the driving force need not be such as to be destructive of any component so that by observing the apparatus under test, those components which are in resonance and might fail can be detected. These components may then be corrected so that their natural frequencies are changed. This may be as simple as adding or subtracting a small quantity of solder at a resistor lead. If desired, a camera 8 or other recording device may be employed.

By use of three light sources not only can the components which are in resonance be detected, but the components which have natural frequency above the driving force may be distinguished from the components having a frequency below the driving force.

If the need is only to determine those components which are in resonance only two light sources are necessary; for example, as shown in Figure 6 only the light sources 5 and 6 or 5 and 7 need be used. That is, red and yellow or red or blue stroboscopic lamps may be used to carry forth the example of Figure 1. With such an arrangement, both the components having natural frequency above and below resonance will exhibit the same halo as indicated in Figures 9 and 10.

While for purposes of example, specific colors red, yellow and blue have been mentioned, it is not essential that these particular colors be used, but colors be selected which exhibit sufficient contrast so as to distinguish those components having different natural frequencies.

Furthermore, the illumination produced by the lamps may be characterized other than by color distinction; for example, the light from the lamps may be of different polarization. Still further for some purposes, the illumination may not be in the visible spectrum but may be in the infra-red or ultra-violet spectrums in which case the recording or detecting device 8 is sensitive to light in these spectrums.

For purposes of illustration, the apparatus and method hereinbefore described is directed to an arrangement wherein the components undergoing test are mounted on a test stand, the vibration of which may be controlled, and the timing of the stroboscopic lights is determined by the pickup unit 3 attached to the test stand. It should be observed that the pickup unit need not be physically attached to the test stand but may be electronically connected or otherwise arranged so as to be sensitive to the impulses which control vibration of the stand. Also the timer 4 may be operated independently of the test stand and its frequency suitably adjusted as to match that of the test stand.

It should also be observed that if the apparatus carrying the components to be tested is a machine, motor, engine vehicle or equipment which is subject to simple or complex vibration in use, it may itself serve as the test stand. For example, an internal combustion engine, or turbine, or aircraft may itself serve as the source of vibrations for the components carried thereon and thus serve as a test stand or base. Also, the vibration imposed, either by a special test stand or other apparatus carrying the components to be tested, may be of the random nature of "noise."

In both cases, the vibrations are quite complex; however pronounced vibrations coinciding to the mechanical "q" of the various components causes them to resonate at their natural frequencies. Under such conditions the timer 4 is operated arbitrarily at various frequencies or caused to sweep through a range of frequencies. For all frequencies of the timer the light sources are maintained in their pre-selected phase relationships as hereinbefore described.

Having thus described certain embodiments and applications of my invention, I do not desire to be limited thereto, but intend to claim all novelty inherent in the appended claims.

I claim:

1. An apparatus for detecting resonant vibration of components of a structure while said structure is subjected to vibration, comprising: at least two light sources of distinguishable character adapted to be directed on said structure; a means for operating the first of said light sources at a preselected frequency and in such phase as to operate at approximately the points of maximum amplitude of those components which may be in resonance with said selected vibration frequency; said means arranged to operate another of said light sources out of phase with the first light source whereby those components in resonance exhibit characteristics derived from the first light source more predominantly than those components out of resonance.

2. An apparatus as set forth in claim 1, wherein: said light sources are visible light sources of different color.

3. An apparatus as set forth in claim 1, wherein: said light sources are polarized light having different polarization.

4. An apparatus as set forth in claim 1, wherein: said light sources have different frequencies in the invisible light bands.

5. An apparatus as set forth in claim 1, wherein: only two light sources are provided and those components having natural frequencies above as well as below said resonant frequency exhibit predominantly the characteristics of said second light source.

6. An apparatus as set forth in claim 1, wherein: three light sources are provided, the second light source being so phased relative to the first light source as to cause those components having a natural frequency higher than said resonant frequency to exhibit characteristics of the second and third light sources in one relationship, the third light source being so phased relative to the first light source as to cause those components having a natural frequency lower than said resonant frequency to exhibit characteristics of the second and third light source in a converse relationship.

References Cited in the file of this patent

UNITED STATES PATENTS

| | | |
|---|---|---|
| 2,270,294 | Hall | Jan. 20, 1942 |
| 2,711,647 | Ongaro et al. | June 28, 1955 |